Patented Jan. 30, 1934

1,945,256

UNITED STATES PATENT OFFICE 1,945,256

DEPOSITION OF RUBBER

Robert Bertram Fisher Frank Clarke, Bramhall, England, assignor to Imperial Chemical Industries Limited, Westminster, England No Drawing. Application October 8, 1930, Serial No. 487,375, and in Great Britain October 21, 1929

2 Claims. (Cl. 18—58)

My invention relates to improvement in processes for making sheets or impregnations of rubber for rubber latex.

Hitherto it has been proposed to obtain rubber sheets or impregnations direct from latex by a dipping process, or by electrophoretic deposition which is the so-called anode process.

I have now devised a novel method of carrying out this operation. My invention broadly consists in the deposition of the rubber on the outer surface of a gas-permeable vessel which is filled with carbon dioxide gas at an appropriate pressure and immersed in the latex. It will thus be seen that an essential feature of my invention is that advantage is taken of the coagulating power of carbon dioxide.

In carrying out my invention I suspend in the latex at the ordinary temperature a gas-permeable vessel, for example, a porous pot, which is so fitted with a gas inlet tube that it can be filled with carbon dioxide under slight, but sufficient, pressure. The rubber is deposited on the external surface of the porous vessel, and the thickness of the deposited film depends on the time for which the action is allowed to proceed. When material of any kind is to be impregnated, it is wrapped or bound round the exterior of the gas-permeable vessel, and impregnation allowed to proceed to any desired degree. I may mix rubber reinforcing substitute in emulsion form, compounding ingredients, etc. with the latex so that they become incorporated with the deposited rubber.

When the deposition process has proceeded to the required degree the sheet or impregnated material is removed from the porous vessel and dried in the air, either at ordinary temperatures or in a warm chamber. The porous vessel may be of any desired size or shape and may thus be employed as a former for rubber articles. The sheets or impregnations may be of any desired shape or thickness.

My process has the advantage that the deposited films or sheets are cleanly and readily separated from the wall of the porous vessel, and that the pores thereof are not clogged. Further, I find that the serum or dispersion medium does not percolate through the pores into the porous vessel but remains entirely in the outer container.

As many apparent and widely different embodiments of this invention may be made without departing from the spirit thereof, it is to be understood that I do not limit myself to the foregoing examples or description except as indicated in the following claims.

I claim—

1. In the art of depositing rubber from rubber latex, the improvement which consists in immersing in the latex a gas-permeable vessel containing carbon dioxide under pressure and causing coagulation of the rubber to take place upon the outer surface of the vessel.

2. In the art of depositing rubber from rubber latex, the improvement which consists in covering a gas-permeable vessel with material to be coated or impregnated with rubber, and immersing the vessel in the latex, said vessel being filled with carbon dioxide gas under a slight pressure, and causing coagulation of the rubber to take place on the surface to be coated, or impregnated.

ROBERT BERTRAM FISHER
FRANK CLARKE.